US011648631B2

(12) United States Patent
Kurasawa et al.

(10) Patent No.: US 11,648,631 B2
(45) Date of Patent: May 16, 2023

(54) FLUX FOR RESIN FLUX CORED SOLDER, RESIN FLUX CORED SOLDER, FLUX FOR FLUX-COATED SOLDER, FLUX-COATED SOLDER, AND SOLDERING METHOD

(71) Applicant: Senju Metal Industry Co., Ltd., Tokyo (JP)

(72) Inventors: Yoko Kurasawa, Saitama (JP); Motohiro Onitsuka, Tochigi (JP); Hisashi Tokutomi, Tokyo (JP); Hiroyoshi Kawasaki, Tokyo (JP)

(73) Assignee: Senju Metal Industry Co., Ltd., Tokyo (JP)

( * ) Notice: Subject to any disclaimer, the term of this patent is extended or adjusted under 35 U.S.C. 154(b) by 0 days.

(21) Appl. No.: 17/256,419

(22) PCT Filed: Jun. 27, 2019

(86) PCT No.: PCT/JP2019/025575
§ 371 (c)(1),
(2) Date: Dec. 28, 2020

(87) PCT Pub. No.: WO2020/004543
PCT Pub. Date: Jan. 2, 2020

(65) Prior Publication Data

US 2021/0268610 A1 Sep. 2, 2021

(30) Foreign Application Priority Data

Jun. 29, 2018 (JP) ............................ JP2018-124563
Apr. 12, 2019 (JP) ............................ JP2019-076281

(51) Int. Cl.
*B23K 35/00* (2006.01)
*B23K 1/00* (2006.01)
(Continued)

(52) U.S. Cl.
CPC .............. *B23K 35/368* (2013.01); *B23K 3/02* (2013.01); *B23K 35/365* (2013.01)

(58) Field of Classification Search
CPC ............ B23K 35/3618; B23K 35/3612; B23K 35/362; B23K 35/36
See application file for complete search history.

(56) References Cited

U.S. PATENT DOCUMENTS 4,092,182 A 5/1978 Arbib et al.
10,688,603 B2 6/2020 Onitsuka et al.
2004/0000355 A1 * 1/2004 Suga .................. B23K 35/3612 148/25

FOREIGN PATENT DOCUMENTS

CN 104416297 A 3/2015
CN 104476016 A 4/2015
(Continued)

OTHER PUBLICATIONS

Communication pursuant to Article 94(3) EPC from the European Patent Office for related Application No. EP 19825971.5 dated Jan. 9, 2023.

*Primary Examiner* — Erin B Saad
(74) *Attorney, Agent, or Firm* — The Webb Law Firm

(57) ABSTRACT

Provided are flux for resin flux cored solder, flux for flux-coated solder, resin flux cored solder using the flux for resin flux cored solder, flux-coated solder using the flux for flux-coated solder, and a soldering method, which have low residue and are excellent in processability. The flux for resin flux cored solder or flux-coated solder contains a solid solvent in an amount of 70 wt % or more and 99.5 wt % or less, and an activator in an amount of 0.5 wt % or more and 30 wt % or less.

9 Claims, 3 Drawing Sheets

3
2
1A
10
101
201
200
100

(51) Int. Cl.

| | |
|---|---|
| ***B23K 3/00*** | (2006.01) |
| ***B23K 35/368*** | (2006.01) |
| ***B23K 3/02*** | (2006.01) |
| ***B23K 35/365*** | (2006.01) |

(56) References Cited

FOREIGN PATENT DOCUMENTS

| | | | |
|---|---|---|---|
| JP | S52152846 | A | 12/1977 |
| JP | 2009195938 | A | 9/2009 |
| JP | 2017113776 | A | 6/2017 |
| JP | 6268507 | B1 | 1/2018 |
| JP | 201861978 | A | 4/2018 |
| JP | 6337349 | B1 | 6/2018 |
| WO | 2010041668 | A1 | 4/2010 |

* cited by examiner

【FIG. 1】
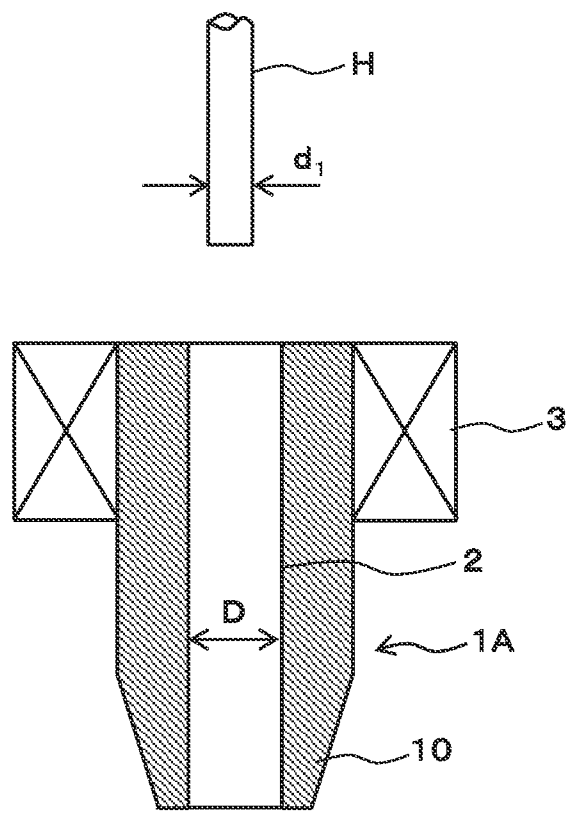
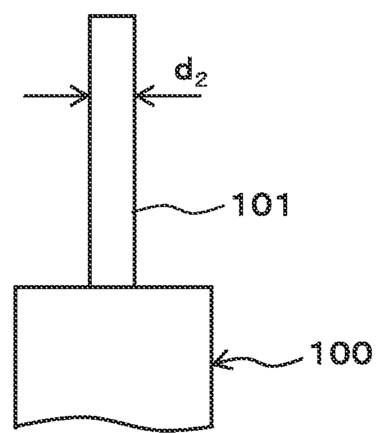

【FIG. 2A】
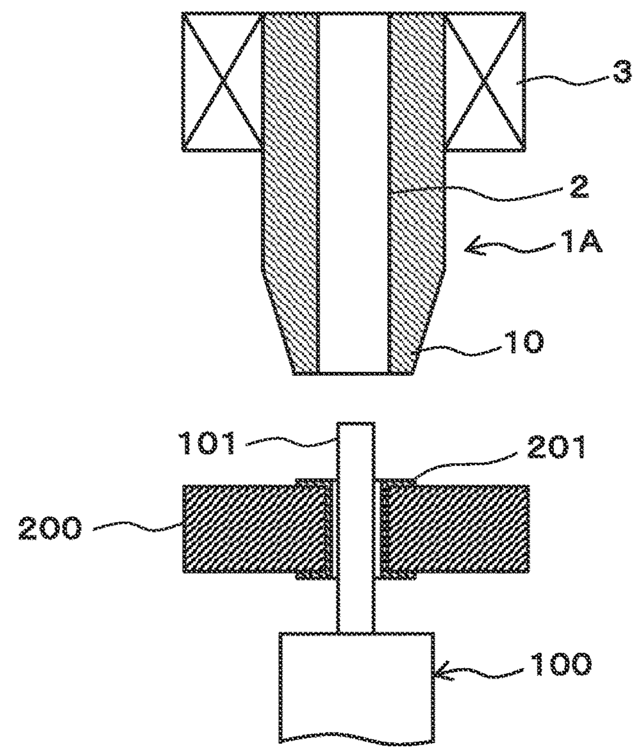
【FIG. 2B】
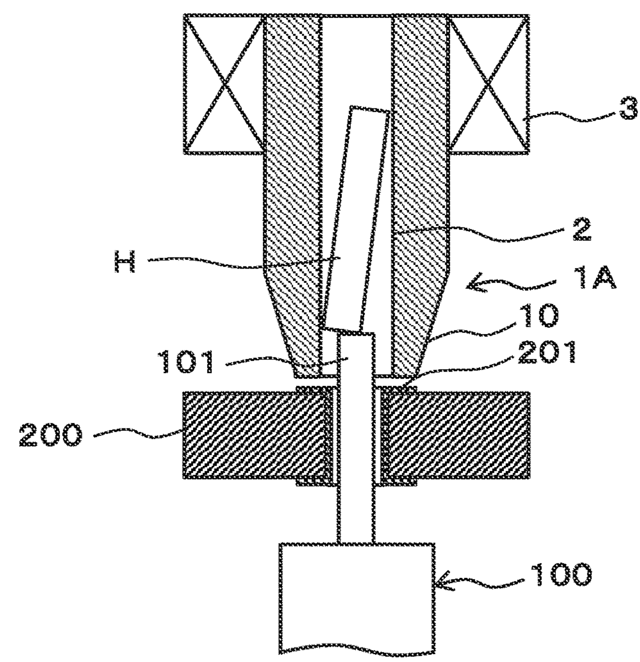

【FIG. 2C】
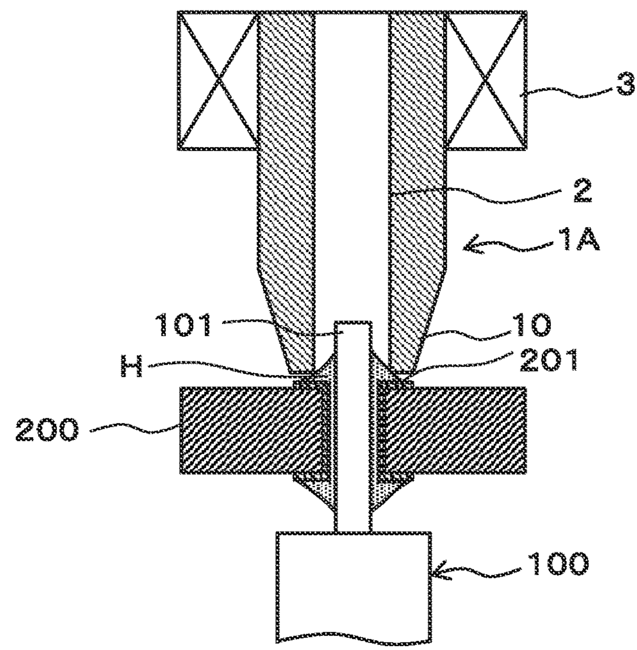
【FIG. 2D】
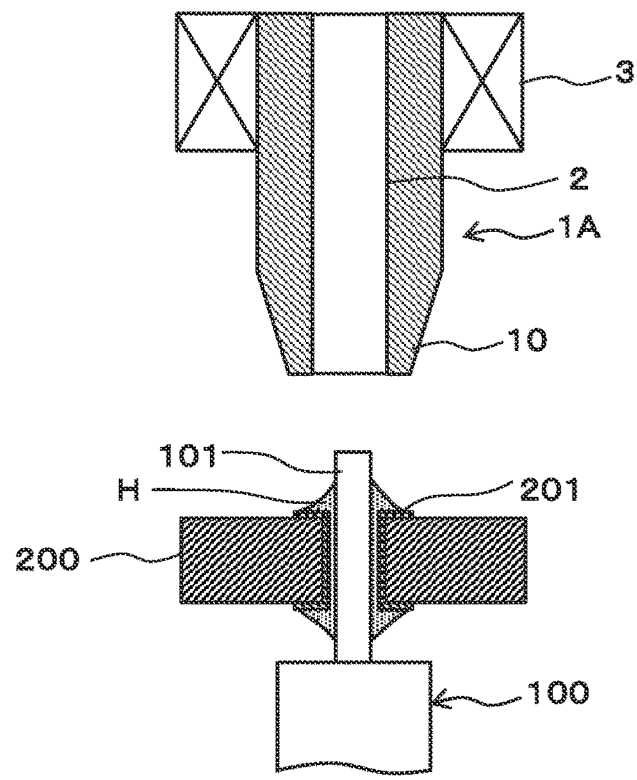

FLUX FOR RESIN FLUX CORED SOLDER, RESIN FLUX CORED SOLDER, FLUX FOR FLUX-COATED SOLDER, FLUX-COATED SOLDER, AND SOLDERING METHOD

CROSS-REFERENCE TO RELATED APPLICATIONS

This application is the United States national phase of International Application No. PCT/JP2019/025575 filed Jun. 27, 2019, and claims priority to Japanese Patent Application Nos. 2018-124563 filed Jun. 29, 2018, and 2019-076281 filed Apr. 12, 2019, the disclosures of which are hereby incorporated by reference in their entirety.

TECHNICAL FIELD

The present invention relates to flux for resin flux cored solder, resin flux cored solder using the flux for resin flux cored solder, flux for flux-coated solder, flux-coated solder using the flux for flux-coated solder, and a soldering method.

BACKGROUND

The flux used in soldering generally has effects of chemically removing metal oxides present on solder and a metal surface of a joint target to be soldered and allowing movement of metal elements at the boundary between them. Therefore, by soldering using the flux, an intermetallic compound can be formed between the solder and the metal surface of the joint target, so that strong joint can be obtained.

As the solder used in the soldering, solder named "resin flux cored solder" in which the flux is filled in wire-like solder has been known. Flux, which is assumed to be used in such resin flux cored solder, has been proposed (for example, see patent document 1).

The flux used in the resin flux cored solder is required to be a solid or a liquid but having high viscosity behavior on processability.

As a soldering method using the resin flux cored solder, it has been known to use a heating member named "soldering iron". Whereas, a technology such that a through hole is provided at a central axis in the solder iron and the soldering is performed by supplying the resin flux cored solder into the through hole has been proposed (for example, see patent document 2). In addition, in the flux used in the soldering iron disclosed in the patent document 2, a technology such that flux containing rosin as base material is used to realize low residue, in order to remove any soldering failures caused by carbonizing the flux residue so as to be left, has been proposed (for example, see patent document 3).

A flux composition used for a flux-coated brazing wire, which contains ester of polyalcohol and at least one component selected from the group of organic acid, flux activator and a hardening agent for flux residue, has been further proposed (for example, see patent document 4). Additionally, flux which contains a solid solvent that is solid at a room temperature has been proposed (for example, see patent document 5). Flux which contains aromatic compound and is solid at atmosphere of 23 degrees C. and one atmospheric pressure has been proposed (for example, see patent document 6). Still further, a technology such that a surface of a solder alloy is coated by flux to form flux-coated solder other than the resin flux cored solder has been proposed (for example, see patent document 7).

Patent Document 1: Japanese Patent Application Publication No. 2017-113776

Patent Document 2: Japanese Patent Application Publication No. 2009-195938

Patent Document 3: Japanese Patent Application Publication No. 2018-61978

Patent Document 4: Japanese Patent Application Publication No. S52-152846

Patent Document 5: Japanese Patent No. 6337349

Patent Document 6: International Publication No. 2010/041668

Patent Document 7: Japanese Patent No. 6268507

SUMMARY

The flux used in the resin flux cored solder is required to have predetermined viscosity so as to be not flown out of the solder at room temperature, and up to now, has contained a predetermined amount of rosin therein. The rosin is hard to volatilize at a heat history estimated in soldering and becomes a chief ingredient of the residue.

When soldering is performed using the soldering iron as disclosed in the patent document 2, there may be a case where the flux for the resin flux cored solder supplied into the through hole becomes the residue after the heating and is adhered to an inside of the through hole. In the soldering using the soldering iron as disclosed in the patent document 2, the resin flux cored solder is supplied into the through hole and the soldering is successively performed in such a condition that the soldering iron is controlled to keep predetermined temperature which exceeds a melting point of the solder. Accordingly, any adhered matters such as the residue is successively heated to become carbides thereof, which cause any burnt deposits inside the through hole. The carbides then deposit in the through hole of the soldering iron, so that a passage in the through hole becomes narrower, thereby being possibility that the resin flux cored solder may not be supplied. The flux disclosed in the patent document 3 realize low residue by a selection of the rosin. When heating it, however, it is required to maintain its fluidity sooner than a case of using the rosin. To the flux composition disclosed in the patent document 4, any composition obtained by esterifying the polyalcohol is always added but when esterifying the composition, its boiling point increases so that heat tolerance is also improved. Therefore, the flux composition becomes residue after the heating.

The present invention solves such problems, and an object thereof is to provide flux for resin flux cored solder, resin flux cored solder using the flux for resin flux cored solder, flux for flux-coated solder, flux-coated solder using the flux for flux-coated solder, and a soldering method, which have low residue and are excellent in processability.

Inventors have found out that a solid solvent and a phenol-based solid solvent allow the flux to have predetermined viscosity, they have a character which is hard to volatilize at heating up to a temperature range estimated in soldering, they have an effect to remove the metal oxides, and they are volatile at a heat history estimated in the soldering and suppress carbonization by the successive heating.

The present inventions are as follows.

(1) Flux for resin flux cored solder comprising:

a solid solvent in an amount of 70 wt % or more and 99.5 wt % or less; and an activator in an amount of 0.5 wt % or more and 30 wt % or less, the flux being used in a soldering method using the resin flux cored solder in which the flux is filled in the solder, and including steps of heating the resin flux cored solder with a soldering iron up to a temperature exceeding a melting point of the solder to heat a joint target and melting the resin flux cored solder, the soldering iron being supplied with the resin flux cored solder into a through hole formed along a central axis thereof and being kept at the temperature exceeding the melting point of the solder to heat the resin flux cored solder supplied into the through hole.

(2) Flux for resin flux cored solder comprising:

a phenol-based solid solvent in an amount of 70 wt % or more and 100 wt % or less; and an activator in an amount of 0 wt % or more and 30 wt % or less, the flux being used in a soldering method using the resin flux cored solder in which the flux is filled in the solder, and including steps of heating the resin flux cored solder with a soldering iron up to a temperature exceeding a melting point of the solder to heat a joint target and melting the resin flux cored solder, the soldering iron being supplied with the resin flux cored solder into a through hole formed along a central axis thereof and being kept at the temperature exceeding the melting point of the solder to heat the resin flux cored solder supplied into the through hole.

(3) Flux for resin flux cored solder comprising:

a phenol-based solid solvent in an amount of more than 0 wt % and 30 wt % or less;

a solid solvent other than the phenol-based solid solvent in an amount of 70 wt % or more and 99.5 wt % or less; and an activator in an amount of 0 wt % or more and 30 wt % or less, the flux being used in a soldering method using the resin flux cored solder in which the flux is filled in the solder, and including steps of heating the resin flux cored solder with a soldering iron up to a temperature exceeding a melting point of the solder to heat a joint target and melting the resin flux cored solder, the soldering iron being supplied with the resin flux cored solder into a through hole formed along a central axis thereof and being kept at the temperature exceeding the melting point of the solder to heat the resin flux cored solder supplied into the through hole.

(4) Flux for resin flux cored solder in which the flux is filled in the solder, the flux comprising:

a solid solvent in an amount of 70 wt % or more and 99.5 wt % or less; and an activator in an amount of 0.5 wt % or more and 30 wt % or less, wherein weight thereof after being heated from 25 degrees C. to 350 degrees C. in $N_2$ atmosphere at a raising rate of 10 degrees C./min is 15% or less of the weight thereof before the heating.

(5) Flux for resin flux cored solder in which the flux is filled in the solder, the flux comprising:

a phenol-based solid solvent in an amount of 70 wt % or more and 100 wt % or less; and an activator in an amount of 0 wt % or more and 30 wt % or less, wherein weight thereof after being heated from 25 degrees C. to 350 degrees C. in $N_2$ atmosphere at a raising rate of 10 degrees C./min is 15% or less of the weight thereof before the heating.

(6) Flux for resin flux cored solder in which the flux is filled in the solder, the flux comprising:

a phenol-based solid solvent in an amount of more than 0 wt % and 30 wt % or less;

a solid solvent other than the phenol-based solid solvent in an amount of 70 wt % or more and 99.5 wt % or less; and an activator in an amount of 0 wt % or more and 30 wt % or less, wherein weight thereof after being heated from 25 degrees C. to 350 degrees C. in $N_2$ atmosphere at a raising rate of 10 degrees C./min is 15% or less of the weight thereof before the heating.

(7) The flux for resin flux cored solder according to any of the above items (1) to (6), wherein the flux is a solid or a liquid having viscosity of 3500 Pa·s or more, at 25 degrees C.

(8) The flux for resin flux cored solder according to any of the above items (1) to (7), wherein the activator is any of an organic acid, an amine, an organohalogen compound, and an amine hydrohalide salt or a combination of two or more of the organic acid, the amine, the organohalogen compound, and the amine hydrohalide salt.

(9) Flux for flux-coated solder in which the flux coats the solder, the flux comprising:

a solid solvent in an amount of 70 wt % or more and 99.5 wt % or less; and an activator in an amount of 0.5 wt % or more and 30 wt % or less, wherein weight thereof after being heated from 25 degrees C. to 350 degrees C. in $N_2$ atmosphere at a raising rate of 10 degrees C./min is 15% or less of the weight thereof before the heating.

(10) Flux for flux-coated solder in which the flux coats the solder, the flux comprising:

a phenol-based solid solvent in an amount of 70 wt % or more and 100 wt % or less; and an activator in an amount of 0 wt % or more and 30 wt % or less, wherein weight thereof after being heated from 25 degrees C. to 350 degrees C. in $N_2$ atmosphere at a raising rate of 10 degrees C./min is 15% or less of the weight thereof before the heating.

(11) Flux for flux-coated solder in which the flux coats the solder, the flux comprising:

a phenol-based solid solvent in an amount of more than 0 wt % and 30 wt % or less;

a solid solvent other than the phenol-based solid solvent in an amount of 70 wt % or more and 99.5 wt % or less; and an activator in an amount of 0 wt % or more and 30 wt % or less, wherein weight thereof after being heated from 25 degrees C. to 350 degrees C. in $N_2$ atmosphere at a raising rate of 10 degrees C./min is 15% or less of the weight thereof before the heating.

(12) The flux for flux-coated solder according to any of the above items (9) to (11), wherein the flux is a solid or a liquid having viscosity of 3500 Pa·s or more, at 25 degrees C.

(13) The flux for flux-coated solder according to any of the above items (9) to (12), wherein the activator is any of an organic acid, an amine, an organohalogen compound, and an amine hydrohalide salt or a combination of two or more of the organic acid, the amine, the organohalogen compound, and the amine hydrohalide salt.

(14) Resin flux cored solder wherein the flux for resin flux cored solder according to any of the above items (1) to (8) is filled in the solder.

(15) Flux-coated solder wherein the flux for flux-coated solder according to any of the above items (9) to (13) coats the solder.

(16) A soldering method using resin flux cored solder in which flux containing a solid solvent in an amount of 70 wt % or more and 99.5 wt % or less and an activator in an amount of 0.5 wt % or more and 30 wt % or less is filled in the solder, the method comprising steps of:

heating the resin flux cored solder with a soldering iron up to a temperature exceeding a melting point of the solder to heat a joint target; and melting the resin flux cored solder, wherein the soldering iron is supplied with the resin flux cored solder into a through hole formed along a central axis thereof and is kept at the temperature exceeding the melting point to heat the resin flux cored solder supplied into the through hole.

(17) A soldering method using resin flux cored solder in which flux containing a phenol-based solid solvent in an amount of 70 wt % or more and 100 wt % or less and an activator in an amount of 0 wt % or more and 30 wt % or less is cored in the solder, the method comprising steps of:

heating the resin flux cored solder with a soldering iron up to a temperature exceeding a melting point of the solder to heat a joint target; and melting the resin flux cored solder, wherein the soldering iron is supplied with the resin flux cored solder into a through hole formed along a central axis thereof and is kept at the temperature exceeding the melting point to heat the resin flux cored solder supplied into the through hole.

(18) A soldering method using resin flux cored solder in which flux containing a phenol-based solid solvent in an amount of more than 0 wt % and 30 wt % or less, a solid solvent other than the phenol-based solid solvent in an amount of 70 wt % or more and 99.5 wt % or less, and an activator in an amount of 0 wt % or more and 30 wt % or less is filled in the solder, the method comprising steps of:

heating the resin flux cored solder with a soldering iron up to a temperature exceeding a melting point of the solder to heat a joint target; and melting the resin flux cored solder, wherein the soldering iron is supplied with the resin flux cored solder into a through hole formed along a central axis thereof and is kept at the temperature exceeding the melting point to heat the resin flux cored solder supplied into the through hole.

(19) A soldering method using resin flux cored solder in which flux containing a solid solvent in an amount of 70 wt % or more and 99.5 wt % or less, and an activator in an amount of 0.5 wt % or more and 30 wt % or less wherein weight thereof after being heated from 25 degrees C. to 350 degrees C. in $N_2$ atmosphere at a raising rate of 10 degrees C./min is 15% or less of the weight thereof before the heating is filled in the solder, the method comprising steps of:

heating the resin flux cored solder with a soldering iron up to a temperature exceeding a melting point of the solder to heat a joint target; and melting the resin flux cored solder.

(20) A soldering method using resin flux cored solder in which flux containing a phenol-based solid solvent in an amount of 70 wt % or more and 100 wt % or less, and an activator in an amount of 0 wt % or more and 30 wt % or less wherein weight thereof after being heated from 25 degrees C. to 350 degrees C. in $N_2$ atmosphere at a raising rate of 10 degrees C./min is 15% or less of the weight thereof before the heating is filled in the solder, the method comprising steps of:

heating the resin flux cored solder with a soldering iron up to a temperature exceeding a melting point of the solder to heat a joint target; and melting the resin flux cored solder.

(21) A soldering method using resin flux cored solder in which flux containing a phenol-based solid solvent in an amount of more than 0 wt % and 30 wt % or less, a solid solvent other than the phenol-based solid solvent in an amount of 70 wt % or more and 99.5 wt % or less, and an activator in an amount of 0 wt % or more and 30 wt % or less wherein weight thereof after being heated from 25 degrees C. to 350 degrees C. in $N_2$ atmosphere at a raising rate of 10 degrees C./min is 15% or less of the weight thereof before the heating is filled in the solder, the method comprising steps of:

heating the resin flux cored solder with a soldering iron up to a temperature exceeding a melting point of the solder to heat a joint target; and melting the resin flux cored solder.

(22) The soldering method according to any of the above items (19) to (21), wherein the soldering iron is supplied with the resin flux cored solder into a through hole formed along a central axis thereof and the soldering iron is kept at the temperature exceeding the melting point to heat the resin flux cored solder supplied into the through hole.

The flux containing the solid solvent, the phenol-based solid solvent or the solid solvent and the phenol-based solid solvent behaves so as to be a solid or have predetermined viscosity, at room temperature.

In addition, by containing the activator when containing no phenol-based solid solvent or containing no activator when containing the phenol-based solid solvent, it has a sufficient activation to the metal oxides, and the solid solvent and the phenol-based solid solvent are flown based on deterioration of their viscosities in the course of heating up to the temperature range exceeding the melting point of the solder.

Therefore, by the present invention, it is possible to be applied on the resin flux cored solder or the flux-coated solder, thereby enabling sufficient activity to remove the metal oxides to be obtained. Since they are not flown at room temperature, it is also preferably applied to the flux for the resin flux cored solder. Further, the solid solvent and the phenol-based solid solvent have volatility in a heat history estimated in the soldering, so that they are preferably applied to an application for low residue.

BRIEF DESCRIPTION OF THE DRAWINGS

FIG. 1 is a diagram for illustrating one example of a soldering iron used in a soldering method of the embodiments according to the present invention.

FIG. 2A is a diagram for showing a soldering method of the embodiments according to the present invention.

FIG. 2B is a diagram for showing the soldering method of the embodiments according to the present invention.

FIG. 2C is a diagram for showing the soldering method of the embodiments according to the present invention.

FIG. 2D is a diagram for showing the soldering method of the embodiments according to the present invention.

DESCRIPTION OF THE PREFERRED EMBODIMENTS

<One Example of Flux for Resin Flux Cored Solder or Flux for Flux-Coated Solder in the Embodiments According to the Present Invention>

Flux for resin flux cored solder or flux for flux-coated solder in these embodiments contains a solid solvent, a phenol-based solid solvent or the solid solvent and the phenol-based solid solvent. The flux for resin flux cored solder or the flux for flux-coated solder in these embodiments does not contain any liquid solvent. The flux for resin flux cored solder or the flux for flux-coated solder will be collectively called as “flux” in the following description.

The flux containing the solid solvent is a solid or has predetermined viscosity so as to be not flown out, at room temperature. The flux containing the phenol-based solid solvent is also a solid or has a predetermined viscosity so as to be not flown out, at room temperature. The solid solvent and the phenol-based solid solvent, which have boiling points near the temperature range estimated in the soldering, have volatility by their heat histories estimated in the soldering.

The flux containing such a solid solvent has a function to remove any metal oxides by containing an activator such as organic acid. The phenol-based solid solvent may also have a function as the activator. Accordingly, the flux containing the phenol-based solid solvent has a function to remove any metal oxides even if it does not contain other activator such as the organic acid.

In the resin flux cored solder in which the flux is filled in the solder, the flux is required to have predetermined viscosity in order to prevent the flux from being flown out of the solder. In a case where the flux according to each of the embodiments is applied to the resin flux cored solder, when an amount of the solid solvent is small, an amount of rosin is required to be increased in order to maintain the viscosity thereof. The rosin, however, has refractory in the heating up to the temperature range estimated in the soldering, and behaves to represent much residue when increasing the amount of the rosin, so that it is not suitable for an application of low residue.

Therefore, the flux according to the first embodiment contains a solid solvent in an amount of 70 wt % or more and 99.5 wt % or less and an activator in an amount of 0.5 wt % or more and 30 wt % or less.

When the flux contains the phenol-based solid solvent, it may function as the flux even when any activators are not contained. Thus, the flux according to the second embodiment contains a phenol-based solid solvent in an amount of 70 wt % or more and 100 wt % or less and an activator in an amount of 0 wt % or more and 30 wt % or less.

In addition, the flux according to the third embodiment contains a solid solvent in an amount of 70 wt % or more and 99.5 wt % or less, a phenol-based solid solvent in an amount of more than 0 wt % and 30 wt % or less, and an activator in an amount of 0 wt % or more and 30 wt % or less. The flux according to each of the embodiments is preferable so as to be a solid or a liquid having viscosity of 3500 Pa·s or more, at 25 degrees C.

As the solid solvent, neopentyl glycol (2,2-dimethyl-1,3-propanediol), dioxane glycol or the like is exemplified. As the phenol-based solid solvent, 4-(1,1,3,3-tetramethylbutyl) phenol, catechol or the like is exemplified.

The flux according to each of the embodiments may contain rosin in an amount of 0 wt % or more and 30 wt % or less. The flux according to each of the embodiments also contains, as the activator, an organic acid in an amount of 0 wt % or more and 30 wt % or less, amine in an amount of 0 wt % or more and 5 wt % or less, amine hydrohalide salt in an amount of 0 wt % or more and 4 wt % or less, and organohalogen compound in an amount of 0 wt % or more and 10 wt % or less. Further, when the organic acid and the amine are added to the flux, a predetermined amount of the organic acid and the amine is reacted with each other to be their salts. Therefore, the reaction of the organic acid and the amine may be inhibited by adding two species or more of the organic acid and the amine after they are reacted with each other to be their salts.

In addition, the flux according to each of the embodiments contains, as the additive, silicon in an amount of 0 wt % or more and 5 wt % or less, organophosphorus compound in an amount of 0 wt % or more and 10 wt % or less, and an antifoam agent in an amount of 0 wt % or more and 3 wt % or less. It may also contain surfactant and coloring material.

As the rosin, natural rosins such as gum rosin, wood rosin, and tall oil rosin, and derivatives obtained from the natural rosins are exemplified. As the rosin derivatives, exemplified are, for example, purified rosins, polymerized rosins, hydrogenated rosins, disproportionated rosins, hydrogenated and disproportionated rosins, acid modified rosins, phenol modified rosins, and α,β unsaturated carboxylic acid modified products (acrylated rosins, maleated rosins, fumarated rosins, and the like), purified products, hydrides, and disproportionated products of the polymerized rosins, esterified products and purified products, hydrides, and disproportionated products of the α,β-unsaturated carboxylic acid modified products. One or two species or more of these materials can be used.

The flux according to each of the embodiments may contain resin such as acrylic resin other than the rosin, in addition to the rosin. As the other resin, at least one resin selected from the group of acrylic resin, terpene resin, modified terpene resin, terpene phenol resin, modified terpene phenol resin, styrene resin, modified styrene resin, xylene resin, modified xylene resin, polyethylene, polypropylene, polyvinyl acetate, polyvinyl alcohol, polyethylene-polypropylene copolymer and polyethylene-polyvinyl acetate copolymer may be further contained. As the modified terpene resin, aromatic modified terpene resin, hydrogenated terpene resin, hydrogenated aromatic modified terpene resin, or the like may be used. As the modified terpene phenol resin, hydrogenated terpene phenol resin may be used. As the modified styrene resin, styrene acrylic resin, styrene maleic acid resin or the like may be used. As the modified xylene resin, phenol modified xylene resin, alkyl phenol modified xylene resin, phenol modified resol-type xylene resin, polyol modified xylene resin, polyoxyethylene-added xylene resin or the like may be used. In addition, the amount of the other resin is 15 wt % or less of the rosin, preferably 10 wt % or less, more preferably 5 wt % or less when a total amount of the rosin is 100.

As the organic acid, exemplified are glutaric acid, adipic acid, azelaic acid, eicosane diacid, citric acid, glycolic acid, succinic acid, salicylic acid, diglycolic acid, dipicolinic acid, dibutyl aniline diglycolic acid, suberic acid, sebacic acid, thioglycol acid, phthalic acid, isophthalic acid, terephthalic acid, dodecanedioic acid, parahydroxyphenylacetic acid, picolinic acid, phenylsuccinic acid, fumaric acid, maleic acid, malonic acid, lauric acid, benzoic acid, tartaric acid, tris(2-carboxyethyl)isocyanurate, glycine, 1,3-cyclohexanedicarboxylic acid, 2,2-bis(hydroxymethyl)propionic acid, 2,2-bis(hydroxymethyl)butanoic acid, 4-tert-butyl benzoic acid, 2,3-dihydroxybenzoic acid, 2,4-diethyl glutaric acid, 2-quinolinecarboxylic acid, 3-hydroxybenzoic acid, malic acid, p-anisic acid, palmitic acid, stearic acid, 12-hydroxystearic acid, oleic acid, linoleic acid, linolenic acid and the like.

Further, as the organic acid, exemplified are dimer acid which is a reactant of oleic acid and linoleic acid, the trimer acid which is a reactant of oleic acid and linoleic acid, the hydrogenated dimer acid that is obtained by adding hydrogen to the dimer acid which is a reactant of oleic acid and linoleic acid, and the hydrogenated trimer acid that is obtained by adding hydrogen to the trimer acid which is a reactant of oleic acid and linoleic acid. Additionally, as for the organic acid, as the dimer acid other than the dimer acid which is a reactant of oleic acid and linoleic acid, the trimer acid other than the trimer acid which is a reactant of oleic acid and linoleic acid, the hydrogenated dimer acid that is obtained by adding hydrogen to dimer acid other than the dimer acid which is a reactant of oleic acid and linoleic acid, and hydrogenated trimer acid that is obtained by adding hydrogen to trimer acid other than the trimer acid which is a reactant of oleic acid and linoleic acid, exemplified are dimer acid which is a reactant of acrylic acid, trimer acid which is a reactant of acrylic acid, dimer acid which is a reactant of methacrylic acid, trimer acid which is a reactant of methacrylic acid, dimer acid which is a reactant of acrylic acid and methacrylic acid, trimer acid which is a reactant of acrylic acid and methacrylic acid, dimer acid which is a reactant of oleic acid, trimer acid which is a reactant of oleic acid, dimer acid which is a reactant of linoleic acid, trimer acid which is a reactant of linoleic acid, dimer acid which is a reactant of linolenic acid, trimer acid which is a reactant of linolenic acid, dimer acid which is a reactant of acrylic acid and oleic acid, trimer acid which is a reactant of acrylic acid and oleic acid, dimer acid which is a reactant of acrylic acid and linoleic acid, trimer acid which is a reactant of acrylic acid and linoleic acid, dimer acid which is a reactant of acrylic acid and linolenic acid, trimer acid which is a reactant of acrylic acid and linolenic acid, dimer acid which is a reactant of methacrylic acid and oleic acid, trimer acid which is a reactant of methacrylic acid and oleic acid, dimer acid which is a reactant of methacrylic acid and linoleic acid, trimer acid which is a reactant of methacrylic acid and linoleic acid, dimer acid which is a reactant of methacrylic acid and linolenic acid, trimer acid which is a reactant of methacrylic acid and linolenic acid, dimer acid which is a reactant of oleic acid and linolenic acid, trimer acid which is a reactant of oleic acid and linolenic acid, dimer acid which is a reactant of linoleic acid and linolenic acid, trimer acid which is a reactant of linoleic acid and linolenic acid, hydrogenated dimer acid which is obtained by adding hydrogen to dimer acid other than the dimer acid which is a reactant of the oleic acid and linoleic acid as described above, hydrogenated trimer acid which is obtained by adding hydrogen to trimer acid other than the trimer acid which is a reactant of the oleic acid and linoleic acid as described above, and the like.

As the amine, exemplified are monoethanolamine, diphenylguanidine, ethylamine, triethylamine, ethylenediamine, triethylenetetramine, 2-methylimidazole, 2-undecylimidazole, 2-heptadecylimidazole, 1,2-dimethylimidazole, 2-ethyl-4-methylimidazole, 2-phenylimidazole, 2-phenyl-4-methylimidazole, 1-benzyl-2-methylimidazole, 1-benzyl-2-phenylimidazole, 1-cyanoethyl-2-methylimidazole, 1-cyanoethyl-2-undecylimidazole, 1-cyanoethyl-2-ethyl-4-methylimidazole, 1-cyanoethyl-2-phenylimidazole, 1-cyanoethyl-2-undecylimidazolium trimellitate, 1-cyanoethyl-2-phenylimidazolium trimellitate, 2,4-diamino-6-[2'-methylimidazolyl-(1')]-ethyl-s-triazine, 2,4-diamino-6-[2'-undecylimidazolyl-(1')]-ethyl-s-triazine, 2,4-diamino-6-[T-ethyl-4'-methylimidazolyl-(1')]-ethyl-s-triazine, 2,4-diamino-6-[T-methylimidazolyl-(1')]-ethyl-s-triazine isocyanuric acid adduct, 2-phenylimidazole isocyanuric acid adduct, 2-phenyl-4,5-dihydroxymethylimidazole, 2-phenyl-4-methyl-5-hydroxymethylimidazole, 2,3-dihydro-1H-pyrrolo [1,2-a]benzimidazole, 1-dodecyl-2-methyl-3-benzylimidazolium chloride, 2-methylimidazoline, 2-phenylimidazoline, 2,4-diamino-6-vinyl-s-triazine, 2,4-diamino-6-vinyl-s-triazine isocyanuric acid adduct, 2,4-diamino-6-methacryloyloxyethyl-s-triazine, epoxy-imidazole adduct, 2-methylbenzimidazole, 2-octylbenzimidazole, 2-pentylbenzimidazole, 2-(1-ethylpentyl)benzimidazole, 2-nonylbenzimidazole, 2-(4-thiazolyl)benzimidazole, benzimidazole, 2-(2'-hydroxy-5'-methylphenyl)benzotriazole, 2-(2'-hydroxy-3'-tert-butyl-5'-methylphenyl)-5-chlorobenzotriazole, 2-(2'-hydroxy-3',5'-di-tert-amylphenyl)benzotriazole, 2-(2'-hydroxy-5'-tert-octylphenyl)benzotriazole, 2,2'-methylenebis[6-(2H-benzotriazol-2-yl)-4-tert-octylphenol], 6-(2-benzotriazolyl)-4-tert-octyl-6'-tert-butyl-4'-methyl-2,2'-methylene bisphenol, 1,2,3-benzotriazole, 1-[N,N-bis(2-ethylhexyl)aminomethyl]benzotriazole, carboxybenzotriazole, 1-[N,N-bis(2-ethylhexyl)aminomethyl]methyl benzotriazole, 2,2'-[ [(methyl-1H-benzotriazol-1-yl)methyl] imino]bisethanol, 1-(1',2'-dicarboxyethyl)benzotriazole, 1-(2,3-dicarboxypropyl)benzotriazole, 1-[(2-ethylhexylamino) methyl]benzotriazole, 2,6-bis [(1H-benzotriazol-1-yl)methyl]-4-methylphenol, 5-methyl benzotriazole, 5-phenyltetrazole and the like.

The amine hydrohalide salt is a compound obtained by causing an amine and hydrogen halide to react, and aniline hydrochloride, aniline hydrobromide, and the like are exemplified. As the amine of the amine hydrohalide salt, the above-described amines can be used, and ethylamine, ethylenediamine, triethylamine, methylimidazole, 2-ethyl-4-methylimidazole, and the like are exemplified. As the hydrogen halide, hydrides of chlorine, bromine, iodine, and fluorine (hydrogen chloride, hydrogen bromide, hydrogen iodide, and hydrogen fluoride) are exemplified. Moreover, borfluoride may be contained in place of, or in combination with the amine hydrohalide salt, and as the borfluoride, fluoroboric acid and the like are exemplified.

As the organohalogen compound, exemplified are trans-2,3-dibromo-1,4-butenediol, triallyl isocyanurate hexabromide, 1-bromo-2-butanol, 1-bromo-2-propanol, 3-bromo-1-propanol, 3-bromo-1,2-propanediol, 1,4-dibromo-2-butanol, 1,3-dibromo-2-propanol, 2,3-dibromo-1-propanol, 2,3-dibromo-1,4-butanediol, 2,3-dibromo-2-butene-1,4-diol, trans-2,3-dibromo-2-buten-1,4-diol, cis-2,3-dibromo-2-butene-1,4-diol, tetrabromophthal acid, bromosuccinic acid, 2,2,2-tribromoethanol, and the like, which are organobromo compounds. In addition, exemplified are choroalkane, chlorinated fatty acid ester, HET acid, HET acid nonhydrate, and the like, which are organochlorine compounds. Additionally, exemplified are fluorochemical surfactant, surfactant including a perfluoroalkyl group, polytetrafluoroethylene and the like, which are organofluoro compounds.

As the silicon, exemplified are dimethyl silicon oil, cyclic silicon oil, methyl phenyl silicon oil, methyl hydrogen silicon oil, higher fatty acid denatured silicon oil, alkyl denatured silicon oil, alkyl aralkyl denatured silicon oil, amino denatured silicon oil, epoxy denatured silicon oil, polyether denatured silicon oil, alkyl polyether denatured silicon oil, carbinol denatured silicon oil, and the like.

As the organophosphorus compound, exemplified are methyl acid phosphate, ethyl acid phosphate, isopropyl acid phosphate, monobutyl acid phosphate, butyl acid phosphate, dibutyl acid phosphate, butoxyethyl acid phosphate, 2-ethylhexy acid phosphate, bis(2-ethylhexy) phosphate, monoisodecyl acid phosphate, isodecyl acid phosphate, lauryl acid phosphate, isotridecyl acid phosphate, stearyl acid phosphate, oleyl acid phosphate, beef tallow phosphate, coconut oil phosphate, isostearyl acid phosphate, alky acid phosphate, tetracosyl acid phosphate, ethylene glycol acid phosphate, 2-hydroxyethyl methacrylate acid phosphate, dibutyl pyrophosphate acid phosphate, 2-ethylhexylphosphonic acid mono-2-ethylhexyl, alkyl(alkyl)phosphonate, and the like.

As the antifoam agent, exemplified are acrylic polymer, vinyl ether polymer, butadiene polymer, and the like.

<Configuration Example of Resin Flux Cored Solder According to the Embodiments>

The resin flux cored solder according to each of the embodiments has a wire shape in which the flux for the resin flux cored solder as described above is filled but in addition to that, may have any shape of column such as cylindric shape called as a pellet, a disk, a ring, a chip, a ball, and a column. The flux used for the resin flux cored solder is required to be a solid at a room temperature in order to prevent the flux from being flown out thereof in a solder-forming step or to have predetermined high viscosity so as to prevent it from being flown out thereof. The viscosity required for the flux in a case where it is used in the resin flux cored solder is 3500 Pa·s or more, for example. A diameter of the resin flux cored solder is 0.1 mm or more and 1.6 mm or less, preferably 0.3 mm or more and 1.3 mm or less, more preferably 0.6 mm or more and 1.0 mm or less. Moreover, the content of the flux filled in the resin flux cored solder is 0.5 wt % or more and 6 wt % or less, preferably 1.5 wt % or more and 3 wt % or less when a total amount of the resin flux cored solder is 100.

The solder is configured to be Sn alone, Sn—Ag based alloy, Sn—Cu based alloy, Sn—Ag—Cu based alloy, Sn—Bi based alloy, Sn—In based alloy, Sn—Zn based alloy, Sn—Pb based alloy or the like, or an alloy in which Sb, Bi, In, Cu, Zn, As, Ag, Cd, Fe, Ni, Co, Au, Ge, P, Pb, Zr or the like is added to any of these alloys.

<Configuration Example of Flux-Coated Solder According to the Embodiments>

Flux-coated solder according to each of the embodiments is solder on which the flux for the flux-coated solder, described above, is coated. The flux-coated solder has a wire shape but in addition to that, may have any shape of column such as cylindric shape called as a pellet, a disk, a ring, a chip, a ball, and a column. The flux coating the solder is a solid, at a room temperature, which is attached to a surface of the solder.

The solder is configured to be Sn alone, Sn—Ag based alloy, Sn—Cu based alloy, Sn—Ag—Cu based alloy, Sn—Bi based alloy, Sn—In based alloy, Sn—Zn based alloy, Sn—Pb based alloy or the like, or an alloy in which Sb, Bi, In, Cu, Zn, As, Ag, Cd, Fe, Ni, Co, Au, Ge, P, Pb, Zr or the like is added to any of these alloys.

<Examples of Effects of Flux for Resin Flux Cored Solder, Flux for Flux-Coated Solder, Resin Flux Cored Solder, and Flux-Coated Solder According to Embodiments>

The flux for resin flux cored solder or flux for flux-coated solder, which contains a solid solvent, a phenol-based solid solvent or a solid solvent and a phenol-based solid solvent, behaves so as to be a solid or have predetermined viscosity, at room temperature.

In addition, by containing an activator when containing no phenol-based solid solvent or not even containing any activator when containing the phenol-based solid solvent, they have a sufficient activation to the metal oxide, and the solid solvent and the phenol-based solid solvent are flown based on deterioration of their viscosities in the course of heating up to the temperature range exceeding the melting point of the solder.

Therefore, the flux according to each of the embodiments is available for the resin flux cored solder or the flux-coated solder, thereby enabling sufficient activity to remove the metal oxides to be obtained. Since they are not flown at room temperature, it is preferably applied to the flux for the resin flux cored solder. Further, the solid solvent and the phenol-based solid solvent have volatility in a heat history estimated in the soldering, so that they are preferably applied to an application for low residue.

<One Example of Soldering Method According to Embodiments>

FIG. 1 is a diagram for illustrating one example of a soldering iron used in the soldering method according to the embodiments and FIGS. 2A, 2B, 2C and 2D are diagrams each for showing the soldering method according to the embodiments.

The soldering method according to the embodiments is applied to a trough-hole technology, a single-sided board and the like. In the soldering iron 1A used in the soldering method according to the embodiments, a through hole 2 is formed along a central axis of the soldering iron 1A and a heater 3 is provided as heating means for heating the soldering iron 1A.

In the soldering iron 1A, a diameter D of the through hole 2 is greater than a diameter $d_1$ of the resin flux cored solder H, so that the resin flux cored solder H can be supplied to a tip 10 of the soldering iron 1A via the through hole 2. In addition, in the soldering iron 1A, the diameter D of the through hole 2 is greater than a diameter d2 of a lead terminal 101 of an electronic component 100, so that the lead terminal 101 can be inserted to the tip 10 of the through hole 2.

In the soldering method according to the embodiments, as shown in FIG. 2A, the lead terminal 101 of the electronic component 100 is inserted to a through hole 201 formed in a substrate 200. The heater 3 also heats the soldering iron 1A up to temperature exceeding the melting point of the solder and the soldering iron 1A is controlled so as to be kept at a predetermined temperature which exceeding the melting point of the solder. The tip 10 of the soldering iron 1A then contacts or approaches the through hole 201 to which the lead terminal 101 has been inserted, as shown in FIG. 2B, so that the lead terminal 101 is inserted to the through hole 2 of the soldering iron 1A.

Next, the resin flux cored solder H cut to a predetermined length is supplied to the through hole 2 of the soldering iron 1A, thereby enabling the resin flux cored solder H to contact the lead terminal 101 inserted to the through hole 2.

By controlling the soldering iron 1A so as to be kept at the predetermined temperature exceeding the melting point of the solder, the resin flux cored solder is heated and melted, as shown in FIG. 2C, and the through hole 201 and the lead terminal 101 are heated.

When heating the resin flux cored solder H with the soldering iron 1A up to the temperature exceeding the melting point of the solder, the viscosity of the flux in the resin flux cored solder is deteriorated, so that the flux is flown to the through hole 201 and the lead terminal 101, thereby enabling any metal oxides on surfaces of the solder, the through hole 201 and the lead terminal 101 to be removed and the molten solder is wetly spread.

Next, as shown in FIG. 2D, by releasing the soldering iron 1A from the through hole 201, the solder wetly spread in the through hole 201 and the lead terminal 101 is hardened.

In a case where the flux used in the resin flux cored solder H in the soldering method as described above is the flux according to each of the embodiments, the flux contains the solid solvent, the phenol-based solid solvent or the solid solvent and the phenol-based solid solvent, so that the flux can be a solid or have predetermined high viscosity. Therefore, it is preferable to the flux for the resin flux cored solder.

In addition, the solid solvent and the phenol-based solid solvent have volatility in a heat history estimated in the soldering. On the other side, when not containing any rosin or even if containing rosin, by setting an amount of the rosin to be 30 wt % or less, the flux can be a solid or have predetermined high viscosity, so that the content of the rosin can be reduced.

This allows to be restrained an amount of residue after being heated of the flux in the resin flux cored solder H supplied to the through hole 2 of the soldering iron 1A. Even when the resin flux cored solder H is supplied to the through hole 2 and the soldering is successively performed in a controlled manner to keep the soldering iron 1A at the predetermined temperature exceeding the melting point of the solder, it is possible to restrain carbide of the residue from being accumulated in the through hole 2, and restrain any failure such that the through hole 2 of the soldering iron 1A is stuffed by the carbide of the residue from occurring.

EXECUTED EXAMPLES

The flux of each of the Executed Examples and the Comparative Examples was prepared with the compositions shown in following Tables 1 and 2 below and amounts of their residues and processabilities were verified. The composition rates in Tables 1 and 2 have been expressed in wt (weight) % when the total amount of the flux is 100.

<Evaluation of Amount of Residue>

(1) Verification Method

As the test evaluation method according to TG method (thermogravimetry), the flux of each of the Executed Examples and each of the Comparative Examples in an amount of 10 mg was filled in an aluminum pan and was heated from 25 degrees C. to 350 degrees C. at a temperature rising rate of 10 degrees C./min under $N_2$ atmosphere using TGD9600 manufactured by ULVAC corporation. It was measured whether or not weight of each flux after heating showed 15% or less of that before the heating.

(2) Criterion for Determination

○: The weight thereof after heating showed 15% or less of that before the heating.

x: The weight thereof after heating showed a weight exceeding 15% of that before the heating.

It is said that in the flux showing that the weight thereof after heating showed 15% or less of that before the heating, components in the flux are sufficiently volatilized by the heating. It is said that in the flux showing that the weight thereof after heating showed a weight exceeding 15% of that before the heating, components in the flux are not sufficiently volatilized by the heating. When the flux which is not sufficiently volatilized is used for the resin flux cored solder and is applied to the soldering method described above, a large amount of the carbides of the residue is accumulated in the through hole of the solder iron, which causes any failure such that the resin flux cored solder cannot be normally supplied.

<Evaluation of Processabilities>

(1) Verification Method

The flux of each of the Executed Examples and each of the Comparative Examples was prepared as specimens and its state at 25 degrees C. was observed, so that it was determined that the flux was either a solid or a liquid. When the flux was a liquid, the flux was put between plates of a rheometer (Thermo Scientific HAAKE MARS III (trade mark)) and then, these plates were rotated at 6 Hz to measure viscosity of the flux. The processabilities thereof when manufacturing the resin flux cored solder were evaluated on the basis of criterion shown below.

(2) Criterion for Determination

○: The state was a solid at 25 degrees C. Alternatively, the state was a liquid at 25 degrees C. but the viscosity measured by the rheometer was 3500 Pa·s or more. When the state was a solid at 25 degrees C. or the state was a liquid at 25 degrees C. but the viscosity measured by the rheometer was 3500 Pa·s or more, the resin flux cored solder could be made.

x: The state was a liquid at 25 degrees C. and the viscosity measured by the rheometer was less than 3500 Pa·s. When the state was a liquid at 25 degrees C. and the viscosity measured by the rheometer was less than 3500 Pa·s, the flux was flown out and the resin flux cored solder could not be made.

<Total Evaluation>

○: ○ marks were indicated in both of the evaluations of the amount of residue and the processabilities.

x: x mark(s) was(were) indicated in any or both of the evaluations of the amount of residue and the processabilities.

TABLE 1

| Material Category | | Material Name | Executed Example 1 | Executed Example 2 | Executed Example 3 | Executed Example 4 | Executed Example 5 | Executed Example 6 | Executed Example 7 | Executed Example 8 | Executed Example 9 |
|---|---|---|---|---|---|---|---|---|---|---|---|
| Solvents | Solid Solvents | neopentyl glycol | 95 | 70 | 99.5 | | | | | | 70 |
| | | dioxane glycol | | | | 95 | | | | | |
| | Phenol-based Solid Solvents | 4-(1,1,3,3-tetramethylbutyl) phenol | | | | | 95 | | 100 | | 30 |
| | | catechol | | | | | | 95 | | 100 | |
| | Solvent | hexyl diglycol | | | | | | | | | |
| Rosins | Natural Rosins | natural rosins | | | | | | | | | |
| | Rosin Derivatives | polymerized rosins | | | | | | | | | |
| | | hydrogenated rosins | | | | | | | | | |
| | | disprportionated rosins | | | | | | | | | |
| | | hydrogenated and disprportionated rosins | | | | | | | | | |
| | | acrylic acid modified rosins | | | | | | | | | |
| | | acrylic acid modified and hydrogenated rosins | | | | | | | | | |
| | | rosin ester | | | | | | | | | |
| Activators | Organic Acids | adipic acid | 5 | 5 | | 5 | 5 | 5 | | | |
| | | pimelic acid | | | | | | | | | |
| | | suberic acid | | | | | | | | | |
| | | dodecanedioic acid | | | | | | | | | |
| | | eicosane diacid | | 25 | | | | | | | |
| | Amine | 2-phenylimidazole | | | | | | | | | |
| | Amine hydrohalide salt | N,N- diethylaniline hydrobromate | | | 0.5 | | | | | | |
| | Organo-halogen compound | 2,2,2-tribrmoethanol | | | | | | | | | |
| | | trans-2, 3-dibromo-2-buten-1,4-diol | | | | | | | | | |
| | | triallyl iso cyanurate hexabromide | | | | | | | | | |
| Additives | Silicon | dimethyl silicon oil | | | | | | | | | |
| | Organo-phosphorus Compound | isodecyl acid phosphate | | | | | | | | | |
| | Antifoam Agent | acrylic polymer | | | | | | | | | |
| Evaluation of Amount of Residue | | | ○ | ○ | ○ | ○ | ○ | ○ | ○ | ○ | ○ |
| Evaluation of Processabilities (Viscosity) | | | ○ | ○ | ○ | ○ | ○ | ○ | ○ | ○ | ○ |
| Total Evaluation | | | ○ | ○ | ○ | ○ | ○ | ○ | ○ | ○ | ○ |
| Material Category | | Material Name | Executed Example 10 | Executed Example 11 | Executed Example 12 | Executed Example 13 | Executed Example 14 | Executed Example 15 | Executed Example 16 | Executed Example 17 | Executed Example 18 |

TABLE 1-continued

| | | | | | | | | | | | |
|---|---|---|---|---|---|---|---|---|---|---|---|
| Solvents | Solid Solvents | neopentyl glycol | 95 | 95 | 95 | | 96 | | | | 90 |
| | | dioxane glycol | | | | | | | | | |
| | Phenol-based Solid Solvents | 4-(1,1,3,3-tetramethylbutyl) phenol | | | | 95 | | 90 | 99 | 99 | |
| | | catechol | | | | | | | | | |
| | Solvent | hexyl diglycol | | | | | | | | | |
| Rosins | Natural Rosins | natural rosins | | | | | | | | | |
| | Rosin Derivatives | polymerized rosins | | | | | | | | | |
| | | hydrogenated rosins | | | | | | | | | |
| | | disprportionated rosins | | | | | | | | | |
| | | hydrogenated and disprportionated rosins | | | | | | | | | |
| | | acrylic acid modified rosins | | | | | | | | | |
| | | acrylic acid modified and hydrogenated rosins | | | | | | | | | |
| | | rosin ester | | | | | | | | | |
| Activators | Organic Acids | adipic acid | | | | | | | | | 5 |
| | | pimelic acid | 5 | | | | | | | | |
| | | suberic acid | | 5 | | | | | | | |
| | | dodecanedioic acid | | | 5 | | | | | | |
| | | eicosane diacid | | | | | | | | | |
| | Amine | 2-phenylimidazole | | | | 5 | | | | | |
| | Amine hydrohalide salt | N,N- diethylaniline hydrobromate | | | | | 4 | | | | |
| | Organo-halogen compound | 2,2,2-tribromoethanol | | | | | | 10 | | | |
| | | trans-2,3-dibromo-2-buten-1,4-diol | | | | | | | 1 | | |
| | | triallyl iso cyanurate hexabromide | | | | | | | | 1 | |
| Additives | Silicon | dimethyl silicon oil | | | | | | | | | 5 |
| | Organo-phosphorus Compound | isodecyl acid phosphate | | | | | | | | | |
| | Antifoam Agent | acrylic polymer | | | | | | | | | |
| Evaluation of Amount of Residue | | | ○ | ○ | ○ | ○ | ○ | ○ | ○ | ○ | ○ |
| Evaluation of Processabilities (Viscosity) | | | ○ | ○ | ○ | ○ | ○ | ○ | ○ | ○ | ○ |
| Total Evaluation | | | ○ | ○ | ○ | ○ | ○ | ○ | ○ | ○ | ○ |

TABLE 2

| Material Category | | Material Name | Executed Example 19 | Executed Example 20 | Executed Example 21 | Executed Example 22 | Executed Example 23 | Executed Example 24 | Executed Example 25 | Executed Example 26 | Executed Example 27 |
|---|---|---|---|---|---|---|---|---|---|---|---|
| Solvents | Solid Solvents | neopentyl glycol | 85 | 92 | 90 | 85 | | | | | |
| | | dioxane glycol | | | | | | | | | |
| | Phenol-based Solid Solvents | 4-(1,1,3,3-tetramethylbutyl)phenol | | | | | 70 | 90 | 90 | 90 | 90 |
| | | catechol | | | | | | | | | |
| | Solvent | hexyl diglycol | | | | | | | | | |
| Rosins | Natural Rosins | natural rosins | | | | | | 5 | | | |
| | Rosin Derivatives | polymerized rosins | | | | | | | 5 | | |
| | | hydrogenated rosins | | | 5 | 10 | 30 | | | | |
| | | disproportionated rosins | | | | | | | | 5 | |
| | | hydrogenated and disproportionated rosins | | | | | | | | | 5 |
| | | acrylic acid modified rosins | | | | | | | | | |
| | | acrylic acid modified and hydrogenated rosins | | | | | | | | | |
| | | rosin ester | | | | | | | | | |
| Activators | Organic Acids | adipic acid | 5 | 5 | | | | | | | |
| | | pimelic acid | | | | | | | | | |
| | | suberic acid | | | | | | | | | |
| | | dodecanedioic acid | | | | | | | | | |
| | | eicosane diacid | | | 5 | 5 | | 5 | 5 | 5 | 5 |
| | Amine | 2-phenylimidazole | | | | | | | | | |
| | Amine hydrhalide salt | N,N-diethylaniline hydrobromate | | | | | | | | | |
| | Organo-halogen compound | 2,2,2-tribromoethanol | | | | | | | | | |
| | | trans-2,3-dibrmo-2-buten-1,4-diol | | | | | | | | | |
| | | triallyl iso cyanurate hexabromide | | | | | | | | | |
| Additives | Silicon | dimethyl silicon oil | | | | | | | | | |
| | Organo-phosphorus Compound | isodecyl acid phosphate | 10 | | | | | | | | |
| | Antifoam Agent | acrylic polymer | | 3 | | | | | | | |
| Evaluation of Amount of Residue | | | ○ | ○ | ○ | ○ | ○ | ○ | ○ | ○ | ○ |
| Evaluation of Processabilities (Viscosity) | | | ○ | ○ | ○ | ○ | ○ | ○ | ○ | ○ | ○ |
| Total Evaluation | | | ○ | ○ | ○ | ○ | ○ | ○ | ○ | ○ | ○ |

| Material Category | | Material Name | Executed Example 28 | Executed Example 29 | Executed Example 30 | Executed Example 31 | Executed Example 32 | Comparative Example 1 | Comparative Example 2 | Comparative Example 3 |
|---|---|---|---|---|---|---|---|---|---|---|
| Solvents | Solid Solvents | neopentyl glycol | | | | | | 50 | | |
| | | dioxane glycol | | | | | | | | |
| | Phenol-based Solid Solvents | 4-(1,1,3,3-tetramethylbutyl)phenol | 90 | 90 | 90 | 75 | 75 | | 50 | |
| | | catechol | | | | | | | | |

TABLE 2-continued

| | | | | | | | | | | |
|---|---|---|---|---|---|---|---|---|---|---|
| | Solvent | hexyl diglycol | | | | | | | | 40 |
| Rosins | Natural Rosins | natural rosins | | | | 5 | | | | 50 |
| | Rosin Derivatives | polymerized rosins | | | | 5 | | | 45 | |
| | | hydrogenated rosins | | | | | 5 | | | |
| | | disproportionated rosins | | | | 5 | | | | |
| | | hydrogenated and disproportionated rosins | | | | | 5 | | | |
| | | acrylic acid modified rosins | 5 | | | 5 | | 45 | | |
| | | acrylic acid modified and hydrogenated rosins | | 5 | | | 5 | | | |
| | | rosin ester | | | 5 | | 5 | | | |
| Activators | Organic Acids | adipic acid | | | | | | | | |
| | | pimelic acid | | | | | | | | |
| | | suberic acid | | | | | | | | |
| | | dodecanedioic acid | | | | | | | | |
| | | eicosane diacid | 5 | 5 | 5 | 5 | 5 | 5 | 5 | 10 |
| | Amine | 2-phenylimidazole | | | | | | | | |
| | Amine hydrhalide salt | N,N-diethylaniline hydrobromate | | | | | | | | |
| | Organo-halogen compound | 2,2,2-tribromoethanol | | | | | | | | |
| | | trans-2,3-dibrmo-2-buten-1,4-diol | | | | | | | | |
| | | triallyl iso cyanurate hexabromide | | | | | | | | |
| Additives | Silicon | dimethyl silicon oil | | | | | | | | |
| | Organo-phosphorus Compound | isodecyl acid phosphate | | | | | | | | |
| | Antifoam Agent | acrylic polymer | | | | | | | | |
| Evaluation of Amount of Residue | | | ○ | ○ | ○ | ○ | ○ | ○ | ○ | ○ |
| Evaluation of Processabilities (Viscosity) | | | ○ | ○ | ○ | ○ | ○ | ○ | ○ | ○ |
| Total Evaluation | | | ○ | ○ | ○ | ○ | ○ | ○ | ○ | ○ |

In the Executed Example 1 which contains neopentyl glycol as the solid solvent in an amount of 95 wt % in a range limited by the present invention and adipic acid as the organic acid in an amount of 5 wt % in a range limited by the present invention, its state was a solid at 25 degrees C. or even when its state was a liquid at 25 degrees C., the viscosity thereof was 3500 Pas or more, thereby enabling to be obtained sufficient effects to the processabilities when manufacturing the resin flux cored solder. In addition, the amount of the residue was 15 wt % or less, which enabled to be obtained any sufficient effect such that the amount of the residue was restrained to be made low residue.

In the Executed Example 2 which contains neopentyl glycol as the solid solvent in a reduced amount of 70 wt % in a range limited by the present invention and adipic acid in an amount of 5 wt % and eicosane diacid in an amount of 25 wt %, as the organic acid, a combination of two species or more of the organic acids being included in a range limited by the present invention, sufficient effects to the processabilities were also obtained. In addition, any sufficient effect such that the amount of the residue was restrained to be made low residue was obtained.

In the Executed Example 3 which contains neopentyl glycol as the solid solvent in an amount of 99.5 wt % in a range limited by the present invention and N, N-diethylaniline hydrobromate as the amine hydrohalide salt in an amount of 0.5 wt % in a range limited by the present invention, sufficient effects to the processabilities were also obtained. In addition, any sufficient effect such that the amount of the residue was restrained to be made low residue was obtained.

In the Executed Example 4 which contains dioxane glycol as the solid solvent in an amount of 95 wt % in a range limited by the present invention and adipic acid as the organic acid in an amount of 5 wt % in a range limited by the present invention, sufficient effects to the processabilities were also obtained. In addition, any sufficient effect such that the amount of the residue was restrained to be made low residue was obtained.

In the Executed Example 5 which contains 4-(1,1,3,3-tetramethylbutyl)phenol as the phenol-based solid solvent in an amount of 95 wt % in a range limited by the present invention and adipic acid as the organic acid in an amount of 5 wt % in a range limited by the present invention, sufficient effects to the processabilities were also obtained. In addition, any sufficient effect such that the amount of the residue was restrained to be made low residue was obtained.

In the Executed Example 6 which contains catechol as the phenol-based solid solvent in an amount of 95 wt % in a range limited by the present invention and adipic acid as the organic acid in an amount of 5 wt % in a range limited by the present invention, sufficient effects to the processabilities were also obtained. In addition, any sufficient effect such that the amount of the residue was restrained to be made low residue was obtained.

In the Executed Example 7 which contains 4-(1,1,3,3-tetramethylbutyl)phenol as the phenol-based solid solvent in an amount of 100 wt % in a range limited by the present invention but contains no other activator such as the organic acid, sufficient effects to the processabilities were also obtained. In addition, any sufficient effect such that the amount of the residue was restrained to be made low residue was obtained.

In the Executed Example 8 which contains catechol as the phenol-based solid solvent in an amount of 100 wt % in a range limited by the present invention but contains no other activator such as the organic acid, sufficient effects to the processabilities were also obtained. In addition, any sufficient effect such that the amount of the residue was restrained to be made low residue was obtained.

In the Executed Example 9 which contains neopentyl glycol as the solid solvent in an amount of 70 wt % in a range limited by the present invention and 4-(1,1,3,3-tetramethylbutyl)phenol as the phenol-based solid solvent in an amount of 30 wt % in a range limited by the present invention but contains no other activator such as the organic acid, sufficient effects to the processabilities were also obtained. In addition, any sufficient effect such that the amount of the residue was restrained to be made low residue was obtained.

In the Executed Example 10 which contains neopentyl glycol as the solid solvent in an amount of 95 wt % in a range limited by the present invention and pimelic acid as the organic acid in an amount of 5 wt % in a range limited by the present invention, sufficient effects to the processabilities were also obtained. In addition, any sufficient effect such that the amount of the residue was restrained to be made low residue was obtained.

In the Executed Example 11 which contains neopentyl glycol as the solid solvent in an amount of 95 wt % in a range limited by the present invention and suberic acid as the organic acid in an amount of 5 wt % in a range limited by the present invention, sufficient effects to the processabilities were also obtained. In addition, any sufficient effect such that the amount of the residue was restrained to be made low residue was obtained.

In the Executed Example 12 which contains neopentyl glycol as the solid solvent in an amount of 95 wt % in a range limited by the present invention and dodecanedioic acid as the organic acid in an amount of 5 wt % in a range limited by the present invention, sufficient effects to the processabilities were also obtained. In addition, any sufficient effect such that the amount of the residue was restrained to be made low residue was obtained.

In the Executed Example 13 which contains 4-(1,1,3,3-tetramethylbutyl)phenol as the phenol-based solid solvent in an amount of 95 wt % in a range limited by the present invention and 2-phenylimidazole as the amine in an amount of 5 wt % in a range limited by the present invention, sufficient effects to the processabilities were also obtained. In addition, any sufficient effect such that the amount of the residue was restrained to be made low residue was obtained.

In the Executed Example 14 which contains neopentyl glycol as the solid solvent in an amount of 96 wt % in a range limited by the present invention and N, N-diethylaniline hydrobromate as the amine hydrohalide salt in an amount of 4 wt % in a range limited by the present invention, sufficient effects to the processabilities were also obtained. In addition, any sufficient effect such that the amount of the residue was restrained to be made low residue was obtained.

In the Executed Example 15 which contains 4-(1,1,3,3-tetramethylbutyl)phenol as the phenol-based solid solvent in an amount of 90 wt % in a range limited by the present invention and 2,2,2-tribromoethanol as the organohalogen compound in an amount of 10 wt % in a range limited by the present invention, sufficient effects to the processabilities were also obtained. In addition, any sufficient effect such that the amount of the residue was restrained to be made low residue was obtained.

In the Executed Example 16 which contains 4-(1,1,3,3-tetramethylbutyl)phenol as the phenol-based solid solvent in an amount of 99 wt % in a range limited by the present invention and trans-2,3-Dibromo-2-butene-1,4-diol as the organohalogen compound in an amount of 1 wt % in a range limited by the present invention, sufficient effects to the processabilities were also obtained. In addition, any sufficient effect such that the amount of the residue was restrained to be made low residue was obtained.

In the Executed Example 17 which contains 4-(1,1,3,3-tetramethylbutyl)phenol as the phenol-based solid solvent in an amount of 99 wt % in a range limited by the present invention and triallyl isocyanurate hexabromide as the organohalogen compound in an amount of 1 wt % in a range limited by the present invention, sufficient effects to the processabilities were also obtained. In addition, any sufficient effect such that the amount of the residue was restrained to be made low residue was obtained.

In the Executed Example 18 which contains neopentyl glycol as the solid solvent in an amount of 90 wt % in a range limited by the present invention, adipic acid as the organic acid in an amount of 5 wt % in a range limited by the present invention, and dimethyl silicon oil as the silicon in an amount of 5 wt % in a range limited by the present invention, sufficient effects to the processabilities were also obtained. In addition, any sufficient effect such that the amount of the residue was restrained to be made low residue was obtained.

In the Executed Example 19 which contains neopentyl glycol as the solid solvent in an amount of 85 wt % in a range limited by the present invention, adipic acid as the organic acid in an amount of 5 wt % in a range limited by the present invention, and isodecyl acid phosphate as the organophosphorus compound in an amount of 10 wt % in a range limited by the present invention, sufficient effects to the processabilities were also obtained. In addition, any sufficient effect such that the amount of the residue was restrained to be made low residue was obtained.

In the Executed Example 20 which contains neopentyl glycol as the solid solvent in an amount of 92 wt % in a range limited by the present invention, adipic acid as the organic acid in an amount of 5 wt % in a range limited by the present invention, and acrylic polymer as the antifoam agent in an amount of 3 wt % in a range limited by the present invention, sufficient effects to the processabilities were also obtained. In addition, any sufficient effect such that the amount of the residue was restrained to be made low residue was obtained.

In the Executed Example 21 which contains neopentyl glycol as the solid solvent in an amount of 90 wt % in a range limited by the present invention, hydrogenated rosins as the rosin derivatives in an amount of 5 wt % in a range limited by the present invention, and eicosane diacid as the organic acid in an amount of 5 wt % in a range limited by the present invention, sufficient effects to the processabilities were also obtained. In addition, any sufficient effect such that the amount of the residue was restrained to be made low residue was obtained.

In the Executed Example 22 which contains neopentyl glycol as the solid solvent in an amount of 85 wt % in a range limited by the present invention, hydrogenated rosins as the rosin derivatives in an amount of 10 wt % in a range limited by the present invention, and eicosane diacid as the organic acid in an amount of 5 wt % in a range limited by the present invention, sufficient effects to the processabilities were also obtained. In addition, any sufficient effect such that the amount of the residue was restrained to be made low residue was obtained.

In the Executed Example 23 which contains 4-(1,1,3,3-tetramethylbutyl)phenol as the phenol-based solid solvent in an amount of 70 wt % in a range limited by the present invention and hydrogenated rosins as the rosin derivatives in an amount of 30 wt % in a range limited by the present invention, sufficient effects to the processabilities were also obtained. In addition, any sufficient effect such that the amount of the residue was restrained to be made low residue was obtained.

In the Executed Example 24 which contains 4-(1,1,3,3-tetramethylbutyl)phenol as the phenol-based solid solvent in an amount of 90 wt % in a range limited by the present invention, natural rosins in an amount of 5 wt % in a range limited by the present invention, and eicosane diacid as the organic acid in an amount of 5 wt % in a range limited by the present invention, sufficient effects to the processabilities were also obtained. In addition, any sufficient effect such that the amount of the residue was restrained to be made low residue was obtained.

In the Executed Example 25 which contains 4-(1,1,3,3-tetramethylbutyl)phenol as the phenol-based solid solvent in an amount of 90 wt % in a range limited by the present invention, polymerized rosins as the rosin derivatives in an amount of 5 wt % in a range limited by the present invention, and eicosane diacid as the organic acid in an amount of 5 wt % in a range limited by the present invention, sufficient effects to the processabilities were also obtained. In addition, any sufficient effect such that the amount of the residue was restrained to be made low residue was obtained.

In the Executed Example 26 which contains 4-(1,1,3,3-tetramethylbutyl)phenol as the phenol-based solid solvent in an amount of 90 wt % in a range limited by the present invention, disproportionated rosins as the rosin derivatives in an amount of 5 wt % in a range limited by the present invention, and eicosane diacid as the organic acid in an amount of 5 wt % in a range limited by the present invention, sufficient effects to the processabilities were also obtained. In addition, any sufficient effect such that the amount of the residue was restrained to be made low residue was obtained.

In the Executed Example 27 which contains 4-(1,1,3,3-tetramethylbutyl)phenol as the phenol-based solid solvent in an amount of 90 wt % in a range limited by the present invention, hydrogenated and disproportionated rosins as the rosin derivatives in an amount of 5 wt % in a range limited by the present invention, and eicosane diacid as the organic acid in an amount of 5 wt % in a range limited by the present invention, sufficient effects to the processabilities were also obtained. In addition, any sufficient effect such that the amount of the residue was restrained to be made low residue was obtained.

In the Executed Example 28 which contains 4-(1,1,3,3-tetramethylbutyl)phenol as the phenol-based solid solvent in an amount of 90 wt % in a range limited by the present invention, acrylic acid modified rosins as the rosin derivatives in an amount of 5 wt % in a range limited by the present invention, and eicosane diacid as the organic acid in an amount of 5 wt % in a range limited by the present invention, sufficient effects to the processabilities were also obtained. In addition, any sufficient effect such that the amount of the residue was restrained to be made low residue was obtained.

In the Executed Example 29 which contains 4-(1,1,3,3-tetramethylbutyl)phenol as the phenol-based solid solvent in an amount of 90 wt % in a range limited by the present invention, acrylic acid modified and hydrogenated rosins as the rosin derivatives in an amount of 5 wt % in a range limited by the present invention, and eicosane diacid as the organic acid in an amount of 5 wt % in a range limited by the present invention, sufficient effects to the processabilities were also obtained. In addition, any sufficient effect such that the amount of the residue was restrained to be made low residue was obtained.

In the Executed Example 30 which contains 4-(1,1,3,3-tetramethylbutyl)phenol as the phenol-based solid solvent in an amount of 90 wt % in a range limited by the present invention, rosin ester as the rosin derivatives in an amount of 5 wt % in a range limited by the present invention, and eicosane diacid as the organic acid in an amount of 5 wt % in a range limited by the present invention, sufficient effects to the processabilities were also obtained. In addition, any sufficient effect such that the amount of the residue was restrained to be made low residue was obtained.

In the Executed Example 31 which contains 4-(1,1,3,3-tetramethylbutyl)phenol as the phenol-based solid solvent in an amount of 75 wt % in a range limited by the present invention, natural rosins in an amount of 5 wt %, polymerized rosins as the rosin derivatives in an amount of 5 wt %, disproportionated rosins as the rosin derivatives in an amount of 5 wt %, acrylic acid modified rosins as the rosin derivatives in an amount of 5 wt %, a combination of two species or more of the rosins being included in a range limited by the present invention, and eicosane diacid as the organic acid in an amount of 5 wt % in a range limited by the present invention, sufficient effects to the processabilities were also obtained. In addition, any sufficient effect such that the amount of the residue was restrained to be made low residue was obtained.

In the Executed Example 32 which contains 4-(1,1,3,3-tetramethylbutyl)phenol as the phenol-based solid solvent in an amount of 75 wt % in a range limited by the present invention, hydrogenated rosins as the rosin derivates in an amount of 5 wt %, hydrogenated and disproportionated rosins as the rosin derivatives in an amount of 5 wt %, acrylic acid modified and hydrogenated rosins as the rosin derivatives in an amount of 5 wt %, and rosin ester as the rosin derivatives in an amount of 5 wt %, a combination of two species or more of the rosins being included in a range limited by the present invention, and eicosane diacid as the organic acid in an amount of 5 wt % in a range limited by the present invention, sufficient effects to the processabilities were also obtained. In addition, any sufficient effect such that the amount of the residue was restrained to be made low residue was obtained.

On the other hand, in the Comparative examples 1 which contains neopentyl glycol as the solid solvent in an amount of 50 wt % below a range limited by the present invention, acrylic acid modified rosins as the rosin derivatives in an amount of 45 wt % over a range limited by the present invention, and eicosane diacid as the organic acid in an amount of 5 wt % in a range limited by the present invention, an effect of low residue was obtained but its state was a liquid at a temperature of 25 degrees C. and had viscosity of less than 3500 Pa·s, so that sufficient effects to the processabilities when manufacturing the resin flux cored solder were not obtained.

In the Comparative examples 2 which contains 4-(1,1,3,3-tetramethylbutyl)phenol as the phenol-based solid solvent in an amount of 50 wt % below a range limited by the present invention, polymerized rosins as the rosin derivatives in an amount of 45 wt % over a range limited by the present invention, and eicosane diacid as the organic acid in an amount of 5 wt % in a range limited by the present invention, the amount of the residue exceeded 15 wt %, so that any effects such that the amount of the residue was restrained to be made low residue was not obtained. In addition, sufficient effects to the processabilities were not obtained.

In the Comparative examples 3 which neither contains any solid solvent or any phenol-based solid solvent but contains hexyl diglycol as the solvent in an amount of 40 wt %, natural rosins in an amount of 50 wt %, and eicosane diacid as the organic acid in an amount of 10 wt %, an effect of low residue was obtained but sufficient effects to the processabilities were not obtained.

From the above, flux containing a solid solvent in an amount of 70 wt % or more and 99.5 wt % or less, and an activator in an amount of 0.5 wt % or more and 30 wt % or less; flux containing a phenol-based solid solvent in an amount of 70 wt % or more and 100 wt % or less and an activator in an amount of 0 wt % or more and 30 wt % or less; flux containing a solid solvent in an amount of more than 70 wt % and 99.5 wt % or less, a phenol-based solid solvent in an amount of more than 0 wt % and 30 wt % or less, and an activator in an amount of 0 wt % or more and 30 wt % or less; resin flux cored solder using any flux; and flux-coated solder using any flux obtained an effect of restraining the amount of the residue. In addition, they obtained good effects to the processabilities.

These effects were not inhibited even when containing any rosins and/or additives in a range limited by the present invention.

The invention claimed is:

1. A flux for a resin flux cored solder, the flux comprising:
- a solid solvent; and
- an activator,
- wherein the solid solvent includes at least any one of neopentyl glycol and dioxane glycol.

2. The flux for a resin flux cored solder according to claim 1,
- wherein the flux comprises the solid solvent in an amount of 70 wt % or more and 99.5 wt % or less,
- wherein the activator is present in an amount of 0.5 wt % or more and 30 wt % or less, and
- wherein the flux has a viscosity of 3500 Pa s or more at 25 degrees C. and is adapted for use in a soldering method using the resin flux cored solder in which the flux is filled in the solder, and including steps of heating the resin flux cored solder with a soldering iron up to a temperature exceeding a melting point of the solder to heat a joint target and melting the resin flux cored solder, the soldering iron being supplied with the resin flux cored solder into a through hole formed along a central axis thereof and being kept at the temperature exceeding the melting point of the solder to heat the resin flux cored solder supplied into the through hole.

3. The flux for a resin flux cored solder according to claim 1,
- wherein the flux is filled in the solder,
- wherein the flux comprises the solid solvent in an amount of 70 wt % or more and 99.5 wt % or less and the activator in an amount of 0.5 wt % or more and 30 wt % or less,
- wherein a weight of the flux after being heated from 25 degrees C. to 350 degrees C. in $N_2$ atmosphere at a raising rate of 10 degrees C./min is 15% or less of the weight thereof before the heating, and
- wherein the flux has a viscosity of 3500 Pas or more at 25 degrees C.

4. The flux for a resin flux cored solder according to claim 1, wherein the flux is a solid or a liquid having a viscosity of 3500 Pas or more, at 25 degrees C.

5. The flux for a resin flux cored solder according to claim 1, wherein the activator is selected from the group consisting of: an organic acid, an amine, an organohalogen compound, an amine hydrohalide salt, and combinations thereof.

6. A resin flux cored solder, wherein the flux according to claim 1 is filled in the solder.

7. A soldering method using a resin flux cored solder in which the flux of claim 1 is filled in the solder, the method comprising the steps of:

heating the resin flux cored solder with a soldering iron up to a temperature exceeding a melting point of the solder to heat a joint target; and melting the resin flux cored solder.

8. The soldering method according to claim 7, wherein the soldering iron is supplied with the resin flux cored solder into a through hole formed along a central axis thereof and is kept at the temperature exceeding the melting point to heat the resin flux cored solder supplied into the through hole.

9. The soldering method according to claim 7, wherein a weight of the flux after being heated from 25 degrees C. to 350 degrees C. in $N_2$ atmosphere at a raising rate of 10 degrees C./min is 15% or less of the weight thereof before the heating.

* * * * *

UNITED STATES PATENT AND TRADEMARK OFFICE
CERTIFICATE OF CORRECTION

PATENT NO. : 11,648,631 B2
APPLICATION NO. : 17/256419
DATED : May 16, 2023
INVENTOR(S) : Yoko Kurasawa et al.

It is certified that error appears in the above-identified patent and that said Letters Patent is hereby corrected as shown below:

In the Claims

Column 28, Line 36, Claim 2, delete "Pa s" and insert -- Pa·s --

Column 28, Line 59, Claim 3, delete "Pa s" and insert -- Pa·s --

Column 28, Line 63, Claim 4, delete "Pa s" and insert -- Pa·s --

Signed and Sealed this
Eleventh Day of July, 2023

Katherine Kelly Vidal
*Director of the United States Patent and Trademark Office*